United States Patent
Aida et al.

(10) Patent No.: US 8,323,071 B2
(45) Date of Patent: Dec. 4, 2012

(54) METHOD OF POLISHING THE INNER PERIPHERAL END SURFACES OF SUBSTRATES FOR A RECORDING MEDIUM USING A BRUSH

(75) Inventors: Katsuaki Aida, Ichihara (JP); Hiroyuki Machida, Ichihara (JP)

(73) Assignee: Showa Denko K.K., Tokyo (JP)

( * ) Notice: Subject to any disclaimer, the term of this patent is extended or adjusted under 35 U.S.C. 154(b) by 1132 days.

(21) Appl. No.: 11/660,106

(22) PCT Filed: Aug. 24, 2005

(86) PCT No.: PCT/JP2005/015819
§ 371 (c)(1),
(2), (4) Date: Feb. 13, 2007

(87) PCT Pub. No.: WO2006/022413
PCT Pub. Date: Mar. 2, 2006

(65) Prior Publication Data
US 2007/0249267 A1    Oct. 25, 2007

Related U.S. Application Data

(60) Provisional application No. 60/606,881, filed on Sep. 3, 2004.

(30) Foreign Application Priority Data

Aug. 26, 2004   (JP) ................... 2004-246280

(51) Int. Cl.
*B24B 1/00* (2006.01)

(52) U.S. Cl. .............. 451/36; 451/51; 451/61; 451/140; 451/180

(58) Field of Classification Search .............. 451/36, 451/41, 51, 52, 59, 61, 124, 140, 143, 180
See application file for complete search history.

(56) References Cited

U.S. PATENT DOCUMENTS

| | | | |
|---|---|---|---|
| 6,280,294 B1 | 8/2001 | Miyamoto | |
| 6,615,613 B1 | 9/2003 | Iwabuchi et al. | |
| 2002/0115391 A1* | 8/2002 | Yamaguchi et al. | ............ 451/49 |
| 2006/0121834 A1 | 6/2006 | Miyamoto | |

FOREIGN PATENT DOCUMENTS

| | | |
|---|---|---|
| JP | 11-221742 A | 8/1999 |
| JP | 2001-162510 A | 6/2001 |
| JP | 2002-123931 A | 4/2002 |

* cited by examiner

*Primary Examiner* — Eileen Morgan
(74) *Attorney, Agent, or Firm* — Sughrue Mion, PLLC

(57) ABSTRACT

There is provided a method of polishing the inner peripheral end surfaces of disk-like substrates for a recording medium using a brush comprising, providing a plurality of pieces of disk-like substrates having circular holes at the central portion thereof; bringing a polishing material slurry containing a polishing material into contact with the object to be polished; inserting a polishing brush into the circular hole of the object from a first side of the object to be polished, and rotating the polishing brush with the shaft as a center to polish the inner peripheral end surfaces of the substrates; and inserting the polishing brush into the circular hole of the object to be polished from a second side opposite to the first side and rotating the polishing brush with the shaft as a center axis to polish the inner peripheral end surfaces of the substrates.

3 Claims, 1 Drawing Sheet

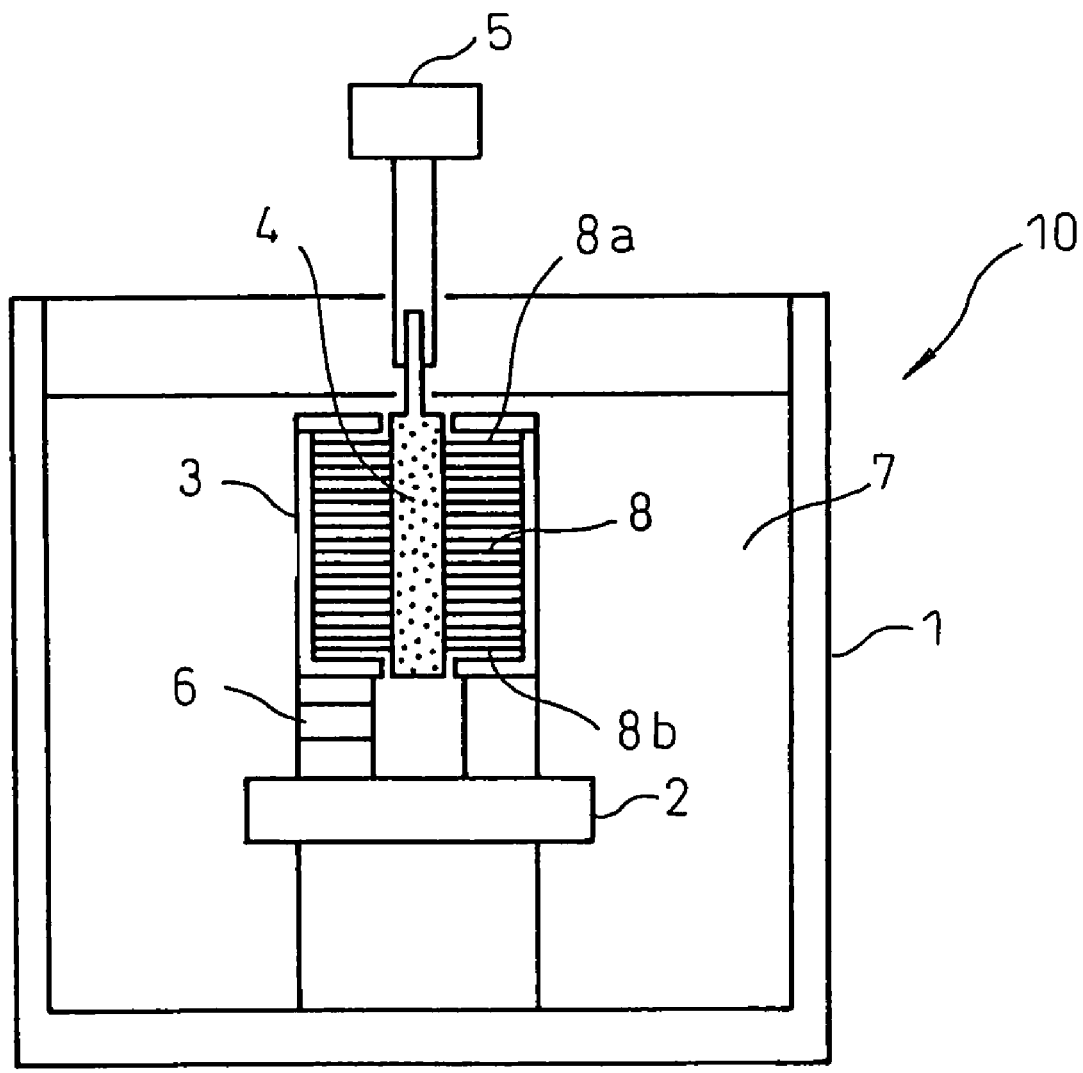

METHOD OF POLISHING THE INNER PERIPHERAL END SURFACES OF SUBSTRATES FOR A RECORDING MEDIUM USING A BRUSH

CROSS REFERENCE TO RELATED APPLICATION

This application is an application filed under 35 U.S.C. §111(a) claiming benefit pursuant to 35 U.S.C. §119(e) of the filing date of Provisional Application No. 60/606,881, filed on Sep. 3, 2004, pursuant to 35 U.S.C. §111(b).

TECHNICAL FIELD

The present invention relates to a method of polishing the inner peripheral end surfaces of substrates for a recording medium and a method of producing the substrates by using the above method, etc.

BACKGROUND ART

An aluminum substrate has been widely used as a substrate for a magnetic recording medium such as a magnetic disk. As the magnetic disks are being produced in smaller sizes and smaller thickness while recording data at a higher density, the aluminum substrate has been gradually replaced by a glass substrate having superior surface flatness and substrate strength. As the glass substrates for magnetic recording medium, there have been used chemically reinforced glass substrates for enhancing the substrate strength and crystallized glass substrates featuring increased substrate strength based on the crystallization.

Accompanying the trend toward high-density recording, further, the magnetic head has been changed from a thin-film head to a magneto-resistive head (MR head) and to a giant magneto-resistive head (GMR head). It is therefore expected that reproducing the contents of the magnetic recording medium of the glass substrate using a magneto-resistive head will become standard in the future.

Thus, a variety of improvements have been made to the magnetic disk for high-density recording. Advances in the magnetic disk, however, has been accompanied by new problems concerning the glass substrate for the magnetic recording medium. One of the problems is to clean the surfaces of the glass substrate. That is, adhesion of a foreign matter to the surfaces of the glass substrate could become a cause of defects in the thin film formed on the surfaces of the glass substrate or a cause of protuberances formed on the surfaces of the thin film. Further, in reproducing the contents the magnetic recording medium of the glass substrate by using a magneto-resistive head, if the flying height (floating height) of the head is lowered to increase the recording density, there may often occur erroneous reproducing operation or a phenomenon in that the reproduction is not accomplished. The cause is that the protuberances formed on the surface of the magnetic disk due to particles on the glass substrate turn into thermal asperity, generating heat in the magneto-resistive head, varying the resistance of the head, and adversely affecting the electromagnetic conversion.

A principal cause of foreign matter on the surface of the glass substrate for the magnetic recording medium described above is that the end surface of the glass substrate is not smooth and, hence, the end surface abrades the wall surface of the resin casing, whereby resin or glass particles formed by the abrasion as well as other particles trapped on the inner peripheral end surface and the outer peripheral end surface of the glass substrate, adhere to the surfaces.

Patent document 1 (JP-A-11-221742) discloses a polishing method wherein a disk-like glass substrate (substrate for a recording medium) having a circular hole at the central portion is immersed in a polishing solution containing free grains, and the inner peripheral end surfaces and/or the outer peripheral end surfaces of the glass substrate are polished by being brought into rotational contact with a polishing brush or a polishing pad while using the polishing solution containing the free grains.

When the inner peripheral end surface of the substrate is to be polished by using the above slurry and the polishing brush, the polishing is effected by rotating the brush while dripping the slurry onto the center hole of the object to be polished which is formed by stacking a plurality of pieces of substrates while aligning the center holes of the disk-like substrates having center holes, or inserting a rod-like polishing brush in the center hole in a state where the object to be polished is immersed in the slurry. The polishing brush has brush hairs studded on the periphery of the rod-like shaft. When a plurality of pieces of substrates are to be simultaneously polished by rotating the polishing brush, there takes place a dispersion in the amount of working on the inner peripheral surface, i.e., the degree of polishing the substrate increases away from the end where the rod is fixed as compared to the inner periphery of the substrate close to the end where the rod is fixed (i.e., as compared to the side that is coupled to the rotary device). This becomes conspicuous with a smaller diameter of the center hole. The above dispersion is considered to stem from the deformation of a thin rod for a substrate having a particularly small center hole due to deviation of the shaft of the rod from the axis of rotation and deflection of the rod when it rotates. Dispersion in the amount of working turns out to be a dimensional error of the product substrate. Therefore, a large dispersion cannot be tolerated.

[Patent document 1] Japanese Unexamined Patent Publication (Kokai) No. 11-221742

DISCLOSURE OF THE INVENTION

It is, therefore, an object of the present invention to provide a method of polishing the inner peripheral end surfaces of substrates without dispersion in the amount of working at the time of polishing the inner peripheral end surfaces of a plurality of disk-like substrates for a recording medium.

The present invention provides a method of polishing the inner peripheral end surfaces of disk-like substrates for a recording medium, a method of producing the substrates by using the above method and substrates produced by the above method as described below.

(1) A method of polishing the inner peripheral end surfaces of disk-like substrates for a recording medium using a brush comprising:

providing a plurality of pieces of disk-like substrates for a recording medium having a circular hole at the central portion thereof thereby forming an inner peripheral end surface, and stacking them while aligning the circular holes to form an object to be polished having the circular hole at the central portion thereof;

bringing a polishing material slurry containing a polishing material into contact with the object to be polished;

inserting a polishing brush having brush hairs studded on the periphery of a rod-like shaft into the circular hole of the object from a first side of the object to be polished in a state where the slurry is brought into contact with the object to be polished, and rotating the polishing brush with the shaft as a center to polish the inner peripheral end surfaces of the substrates; and inserting the polishing brush into the circular hole of the object to be polished from a second side opposite to the first side in a state where the slurry is brought into contact with the object to be polished, and rotating the polishing brush with the shaft as a center to polish the inner peripheral end surfaces of the substrates.

(2) The method of polishing using a brush according to (1) above, wherein the polishing brush is inserted in the circular hole of the object to be polished from the first side to polish the inner peripheral end surfaces of the substrates, the object to be polished is inverted relative to the direction of inserting the brush, and the polishing brush is inserted in the circular hole of the object to be polished from a second side opposite to the first side to polish the inner peripheral end surfaces of the substrates.

(3) The method of polishing using a brush according to (1) or (2) above, wherein the polishing brush is rotated and is reciprocally moved in the direction of inserting the brush relative to the object to be polished to effect the polishing.

(4) A method of producing disk-like substrates for a recording medium including a step of effecting the method of polishing using a brush according to any one of (1) to (3) above.

(5) A substrate produced by the method of producing disk-like substrates for a recording medium of (4) above.

According to the polishing method of the present invention, first, the polishing brush is inserted from the first side to effect the polishing and, then, the polishing brush is inserted from the second side, which is the opposite side, to effect polishing, preventing dispersion in the amount of working that occurs among a plurality of disk-like substrates for a recording medium. In particular, it is made possible to prevent dispersion in the amount of working even with the disk-like substrates for a recording medium have a center hole of an inner diameter of not larger than 6 mm.

BRIEF DESCRIPTION OF THE DRAWINGS

FIG. 1 is a cross-sectional view of a polishing device that can be used in the polishing method of the present invention.
1 polishing device container
2 holding plate
3 substrate holder
4 rotary brush for polishing
5 rotary drive unit
6 polishing material slurry flow port
7 polishing material slurry
8 substrate
10 polishing device

BEST MODE FOR CARRYING OUT THE INVENTION

The polishing method of the present invention is to simultaneously polish the inner peripheral end surfaces of a plurality of stacked disk-like substrates for a recording medium by using a slurry which contains a polishing material and a polishing brush having hairs studded on the periphery of the rod. FIG. 1 is a cross-sectional view schematically illustrating a polishing device that can be used in the polishing method of the present invention. A polishing device 10 includes a polishing device container 1, a holding plate 2, a substrate holder 3 installed on the holding plate 2, a rotary brush 4 for polishing, and a rotary drive unit 5. The interior of the polishing device container 1 is filled with a polishing material slurry 7. The brush 4 is brought into rotational contact with the inner peripheral end surfaces of the substrates 8 with the polishing material slurry 7 that flows through a polishing material slurry flow port 6 and through the inside of the substrate holder 3. In this device 10, the substrates are immersed in the polishing material slurry 7, so that the substrates come in contact with the slurry 7. However, the slurry may be dropped on the center holes at the central portions of the substrates, so that the substrates are wet with the slurry.

More favorable polishing can be effected if the brush 4 can be moved up and down relative to the stack of substrates forming an object to be polished in addition to being rotated. The up-and-down motion can be accomplished by moving the brush 4 up and down or by moving the substrate holder 3 up and down.

In general, when the inner peripheral end surfaces are polished by rotating the brush 4 that is introduced into the circular holes in the central portions in a state where a plurality of substrates are stacked one upon the other, the amount of working increases at the inner peripheral end on the second side 8b remote from the fixed end as compared to that at the inner peripheral end on the first side 8a which is close to the rotary drive unit 5 (i.e., close to the fixed end). This phenomenon is presumably caused by the deflection of the rod of the brush and by the deviation of the shaft of the rod from the axis of rotation. In recent years, the requirement for the dimensional precision of the disk-like substrate for a recording medium has become very stringent, and the amount of working the inner peripheral end surfaces by polishing must be strictly controlled. Now, it is possible to effect the polishing satisfying the stringent requirement for the dimensional precision by effecting the polishing by inserting the polishing brush from the first side and, then, effecting the polishing by inserting the polishing brush from the second side which is the opposite side. According to an embodiment of the method of the present invention, therefore, a stack of a plurality of substrates 8 is so set on the substrate holder 3 that the first side 8a is on the upper side. After the polishing is executed to some extent, the substrates 8 are taken out from the device 10, inverted, and are so set that the second side 8b is on the upper side to effect the polishing. According to another embodiment, the substrate holder 3 can be inverted upside down so that, after the polishing is effected to some extent, the substrate holder 3 is inverted to carry out the method of the present invention. Further, the brush 4 in the device 10 may be introduced into the circular holes of the substrates from either the upper side or the lower side. The upper (or lower) brush is introduced into the circular holes in the substrates and, after the polishing is effected to some extent, the brush 4 is introduced into the circular holes of the substrates from the lower side (or upper side) to effect the polishing thereby to carry out the invention.

There is no particular limitation on the polishing material, or on the slurry containing it, that are used in the polishing method of the present invention, and there can be used any polishing material and the polishing material slurry that have been known in this field of art. Concretely, there can be used such polishing materials as rare earth oxide, iron oxide, zirconium oxide or silicon dioxide. To polish the surfaces of the glass substrates, there can be used a polishing material containing rare earth oxide and, particularly, cerium oxide as a chief component on account of its polishing rate that is several times superior to that of iron oxide, zirconium oxide or silicon dioxide. Described below is a polishing material slurry including cerium oxide though this is not intended to impose any limitation.

The polishing material slurry can be obtained by dispersing in water the polishing material which contains, as a chief component, a rare earth oxide containing cerium oxide. The slurry contains a dispersing agent, a chelating agent and the like as required.

As the polishing material comprising chiefly a mixture of rare earth oxides containing cerium oxide that is to be contained in the polishing material slurry, there can be exemplified a low-cerium polishing material of the bastnaesite type containing cerium oxide in an amount of about 50% by mass or of the chlorinated rare earth type, a high-cerium polishing material of the synthetic type containing cerium oxide in an amount of 70 to 90% by mass, and a highly pure cerium oxide containing cerium oxide in an amount of not less than 99% by mass.

The bastnaesite type polishing material is obtained by pulverizing bastonaesite, which is a fluorinated carbonate mineral of rare earth elements, and by conducting the steps of chemical treatment, drying, roasting, milling, classifying and finishing. The bastnaesite type polishing material contains about 50% by mass of cerium oxide and, further, contains other rare earth elements as basic fluorides, such as LaOF, NdOF, or PrOF. The chlorinated rare earth type polishing material is obtained by forming a hydroxide cake of a chlorinated rare earth, drying it, roasting it as a partial sulfate, followed by milling, classifying and finishing, and contains cerium oxide in an amount of about 50% by mass as well as other rare earth elements as basic anhydrous sulfates, such as $La_2O_3.SO_3$, $Nd_2O_3.SO_3$ and $Pr_5O_{11}.SO_3$.

The high-cerium polishing material of the synthetic type is obtained by roasting a starting material such as bastnaesite, dissolving it by using nitric acid, heating it while adjusting the pH with a dilute ammonia water to hydrolyze $Ce^{4+}$ to form a hydroxide thereof, and conducting the steps of filtering, drying, roasting, milling, classifying and finishing, and contains cerium oxide in an amount of 70 to 90% by mass. The highly pure cerium oxide is obtained by dissolving an oxidized rare earth in nitric acid, extracting $Ce^{4+}$ existing in an aqueous solution with tributyl phosphate-benzene to transfer it into an organic phase, reversely extracting it with an aqueous phase containing a reducing agent such as sodium nitrite to form cerium oxalate, followed by roasting. The purity of cerium oxide usually becomes as high as not less than 99.9% by mass.

The cerium oxide has a Moh's hardness of 5.5 to 6.5 which is equal to, or slightly higher than, the Mohs' hardness of a glass and can be finely adjusted. Therefore, the cerium oxide can be favorably used as a material for polishing the glass. Both the low-cerium polishing material and the high-cerium polishing material have excellent polishing power. Here, however, the high-cerium polishing member has a feature of a particularly long life. Though there is no particular limitation on the particle size of the polishing material comprising chiefly a mixture of rare earth oxides including cerium oxide used for the polishing material composition, there can be preferably used a polishing material having particle sizes corresponding to a cumulative value of 50% of volume distribution of 0.5 to 3 μm as measured in compliance with JIS R 6002, "6. Method of Testing Electric Resistance". It is desired that the crystal system of the cerium oxide is a cubic system.

The polishing material slurry may contain a chelating agent, as required. When the chelating agent is contained, the reactivity of the glass component formed by polishing can be lowered. In a conventional polishing of the glass surfaces for finishing, the polishing material slurry is usually used by being circulated. As the polishing material slurry is used for extended periods of time, however, the glass component which is the object to be polished gradually increases in the slurry that is used by being circulated. If the glass component uniformly covers the surfaces of the polishing material particles, not only the precipitate of the polishing material becomes very hard but also the precipitate of the polishing material deposits thereon again due to its high affinity to the glass surfaces, deteriorating the ability of the glass to be washed.

If the polishing material slurry contains a chelating agent, the reactivity drops between the surfaces of the polishing material particles and the surfaces of the glass, and the surfaces of the polishing material particles are prevented from being covered with the glass component. As a result, no hard precipitate forms and the deterioration of the ability to be washed can be inhibited. Preferred concrete examples of the chelating agent include o-phenanthroline, gluconic acid and a salt thereof, amino acid and ethylenediaminetetraacetic acid. As the gluconic acid and the salt, thereof, there can be exemplified a gluconic acid and a sodium salt, a calcium salt, a zinc salt and a ferrous salt thereof.

There is no particular limitation on the amino acid that is contained, and there can be used, for example, an acidic amino acid, a neutral amino acid, a basic amino acid, metal salts thereof, and compounds in which hydrogen atoms of the amino group of the amino acid are partly substituted with an alkyl group, a hydroxylalkyl group or an alkoxyl group. However, if the polishing material slurry becomes acidic, the chemical effect of the cerium oxide itself for polishing the glass drops and the working speed decreases. When the acidic amino acid is to be used, therefore, it is desired to also use a basic amino acid in combination. Further, the amino acid may be either the one that naturally exists or one that is 'synthesized. Moreover, the amino acid having an optical isomer may be either of the D-type or the L-type.

As the amino acid that can be used for the polishing material slurry, there can be exemplified glycine, alanine, valine, leucine, isoleucine, cerin, threonine, cysteine, cystine, methionine, aspartic acid, glutamic acid, lysine, alginine, phenylalanine, tyrosine, histidine, tryptophane, proline, hydroxyproline, diiodotyrosine, thyroxine, hydroxylysine, β-alanine, γ-aminobutyric acid, anthranilic acid, m-aminobenzoic acid, and p-aminobenzoic acid. Among them, glycine and alginine can be particularly preferably used. The amino acid can be used in one kind alone or in two or more kinds in combination.

Among the above chelating agents, it is desired to use o-phenanthroline and gluconic acid as well as a salt thereof. It is desired that the content of the chelating agent is 0.05 to 0.3% by mass. When its content is smaller than 0.05% by mass, the effect of suppressing the reactivity of the glass component is poor. When its content exceeds 0.3% by mass on the other hand, the polishing rate decreases.

The polishing material slurry can further contain an acetonato complex of aluminum having 1 to 3 acetonato ligands. When the acetonato complex of aluminum is contained, the polishing material is suppressed from adhering to the glass substrate or to the polishing device, and lowering in the ability to be washed is prevented. Usually, the polishing material is a super-fine powder having an average particle size of about 1 to about 2 μm. Due to its surface activity, the polishing material is aggregated in the polishing slurry. The aggregated particles lower the apparent surface area and suppress the polishing material from adhering onto the glass substrate and the polishing device. However, the particles on the outermost shell exist while maintaining their activity. Once adhered to the glass substrate and the polishing device, the particles can no longer be removed by washing such as by running water or ultrasonic application. The ordinary polishing material tends to adhere onto the glass substrate and the polishing device. Contrary to this, the polishing material containing the acetonato complex of aluminum is suppressed from adhering due to the interaction between the acetonato complex of aluminum and the aggregated particles of the polishing material in the polishing material slurry, preventing a lowering of the ability to be washed.

Concrete examples of the acetonato complex of aluminum that is used include a complex having an acetyl acetonate (R=methyl) ligand such as aluminum tris(acetylacetonate) and a complex having an ethyl acetoacetate (R=ethoxy) ligand such as aluminum tris(ethyl acetoacetate). Among them, it is desired to use aluminum tris(acetylacetonate). The acetonato complex of aluminum may be the one having two or three kinds of different acetonato ligands in a molecule. Further, the acetonato complex of aluminum may be used in a single kind or in two or more kinds in combination. It is desired that the content of the acetonato complex of aluminum is 0.05 to 0.3% by mass. When the content is smaller than 0.05% by mass, the effect for preventing the adhesion of the polishing material is poor. When the content exceeds 0.3% by mass, on the other hand, the polishing rate decreases.

To improve the dispersion of particles, to prevent sedimentation and to improve workability, the polishing material slurry may be further blended, as required, with glycols such as ethylene glycol and polyethylene glycol, phosphates such as tripolyphosphate and hexametaphosphate, polymeric disperants such as polyacrylate, cellulose ethers such as methyl cellulose and carboxymethyl cellulose, and water-soluble polymers such as polyvinyl alcohol. The amount of their addition to the polishing material is, usually, 0.05 to 20% by mass, preferably, 0.1 to 15% by mass and, more preferably, 0.1 to 10% by mass.

The polishing material slurry is usually used by being dispersed with a dispersant such as water at a concentration of about 5 to 30% by mass. As the dispersant, there is used water or a water-soluble organic solvent. As the water-soluble organic solvent, there can be exemplified alcohol, polyhydric alcohol, acetone and tetrahydrofuran. Water, however, is usually used. It is also allowable to add an assistant that is usually used for an ordinary cerium oxide polishing material.

The slurry used in the method of the present invention may be obtained by mixing starting materials together and has no particular limitation. Desirably, however, the slurry may be mechanically mixed and prepared at the above mixing ratio by using a ball mill or a high-speed mixer.

The end surfaces of the substrates are usually polished after circular holes at the centers of the glass substrates are formed and the inner peripheral end surfaces and the outer peripheral end surfaces are chamfered. Thereafter, the substrates may be polished on the recording surfaces thereof and, as required, are chemically strengthened by using a chemical strengthening solution such as potassium nitrate or sodium nitrate.

On the thus fabricated substrates, there are successively overlaid an underlying layer, a magnetic layer, a protection layer and a lubricating layer to produce a magnetic recording medium. As the underlying layer, there can be usually used a nonmagnetic material such as Cr, Mo, Ta, W, V, B or Al though this is not to impose any limitation. As the magnetic layer, there can be used a magnetic film comprising chiefly Co. As the protection layer, there can be used a Cr film or a carbon film. The lubricating layer can be formed by diluting a perfluoroether which is a liquid lubricant with a fluoro-type solvent, applying it and drying it.

EXAMPLES

The method of the present invention will be described in further detail by way of an Example which, however, is not intended to limit the invention.

Example 1

174 pieces of glass substrates (TS-10SX manufactured by Ohara Co.) for a hard disk (HD) each having a diameter (outer diameter) of 48 mm, a diameter (inner diameter of the center hole) of 12 mm and a thickness of 0.560 mm, were stacked and were subjected to a first polishing on their inner peripheral end surfaces by using a polishing device shown in FIG. 1 under the conditions described below. The inner peripheral end surface of the substrate included an end edge surface of 0.270 mm and chamfered portions of 0.145 mm on both sides thereof.
1. Polishing:
1.1. Polishing Material Slurry.
Kind of polishing material, grain size: cerium oxide (SHOROX A-10 manufactured by Showa Denko Co.), average particle size, 1.4 μm.
Dispersion medium: water
Dispersing agent: sodium hexametaphosphate
Concentration of polishing material in the slurry: 10% by mass
Material of brush, length of hair, diameter of hair: nylon, 3 mm, φ0.2 mm.
Rotational speed of brush: 2000 rpm
Polishing time: 10 min.

Next, the stack of substrates was inverted, and a second polishing was conducted under the conditions same as those described above.

Comparative Example 1

The polishing was conducted for a period of time twice as long as that of the first polishing of Example 1 above but under the same conditions.
2. Testing for Evaluation.
2.1. Observing Defects on the Surface.

The substrates polished in Example and in Comparative Example above were observed for defects on the surfaces. The surfaces were observed along the whole inner peripheral end surfaces for the presence of scars and pits by using a microscope manufactured by Olympus Co. at a magnification of 200 times.
2.2. Inspecting the Sizes of the Inner Peripheral End Surfaces.

A total of three substrates were measured for their sizes including the substrates of the outermost sides (two substrates of the first side and the second side) and the substrate at the center that were polished in Example and in Comparative Example above. The results were as shown in Table 1 below.

TABLE 1

| Position of substrate | Example 1 | Comparative Example 1 |
|---|---|---|
| First side | 12.011 mm | 12.004 mm |
| Center | 12.010 mm | 12.008 mm |
| Second side | 12.008 mm | 12.016 mm |

From the above results of testing, it was confirmed that the surfaces were observed to contain no scar or no pit in both Example 1 and Comparative Example 1. As for the sizes of the inner peripheral end surfaces, a dimensional error of 12 µm was observed in the conventional method of Comparative Example 1 while the surfaces were finished while maintaining a dimensional precision permitting an error of not larger than 3 µm in Example 1 of the present invention.

The invention claimed is:

1. A method of producing disk substrates for a recording medium by polishing the inner peripheral end surfaces of disk substrates with a brush comprising:
    providing a plurality of pieces of disc substrates for a recording medium having a circular hole at the central portion thereof thereby forming an inner peripheral end surface, and stacking them while aligning the circular holes to form an object to be polished having the circular hole at the central portion thereof;
    bringing a polishing material slurry containing a polishing material into contact with said object to be polished;
    inserting a polishing brush, having brush hairs studded on the periphery of a rod-like shaft, into the circular hole of said object from a first side of said object to be polished in a state where said slurry is brought into contact with said object to be polished, and rotating the polishing brush with the shaft as a center axis to polish the inner peripheral end surfaces of the substrates; and
    inserting said polishing brush into the circular hole of said object to be polished from a second side opposite to said first side in a state where said slurry is brought into contact with said object to be polished, and rotating the polishing brush with the shaft as a center axis to polish the inner peripheral end surfaces of the substrates.

2. The method of producing disk substrates according to claim 1, wherein said polishing brush is inserted in the circular hole of said object to be polished from said first side to polish the inner peripheral end surfaces of the substrates, said object to be polished is inverted relative to the direction of inserting the brush, and said polishing brush is inserted in the circular hole of said object to be polished from a second side opposite to said first side to polish the inner peripheral end surfaces of the substrates.

3. The method of producing disk substrates according to claim 1, wherein the polishing brush is rotated and is reciprocally moved in the direction of inserting the brush relative to said object to be polished to effect the polishing.

* * * * *